C. F. HOTCHKISS.
FLEXIBLE SHAFT.
APPLICATION FILED JAN. 30, 1914.
1,228,439.
Patented June 5, 1917.
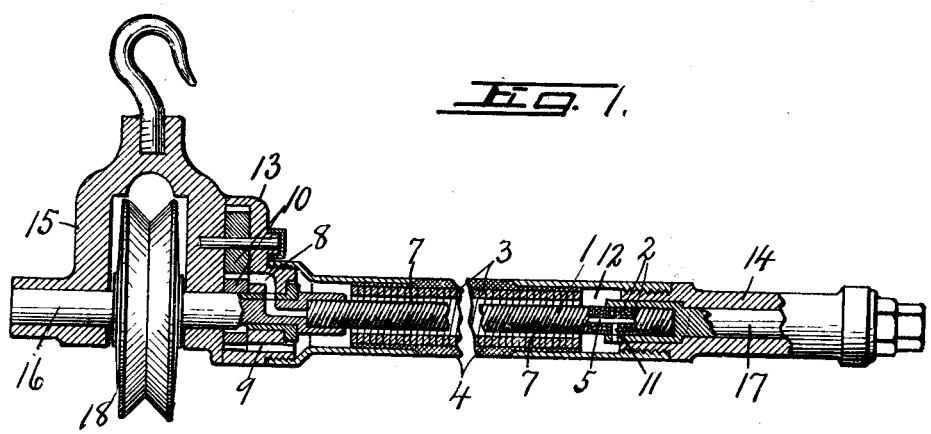
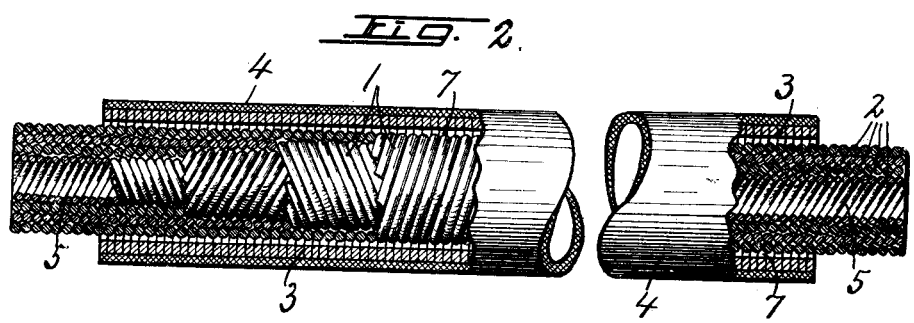
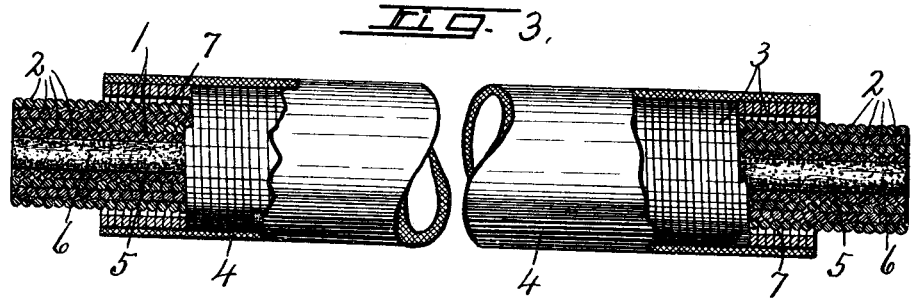
WITNESSES:
INVENTOR.
C. F. Hotchkiss
BY Howard P. Denison
ATTORNEY.

UNITED STATES PATENT OFFICE.

CLARENCE F. HOTCHKISS, OF BINGHAMTON, NEW YORK.

FLEXIBLE SHAFT.

1,228,439.     Specification of Letters Patent.     Patented June 5, 1917.

Application filed January 30, 1914. Serial No. 815,413.

*To all whom it may concern:*

Be it known that I, CLARENCE F. HOTCHKISS, of Binghamton, in the county of Broome, in the State of New York, have invented new and useful Improvements in Flexible Shafts, of which the following, taken in connection with the accompanying drawings, is a full, clear, and exact description.

This invention relates to certain improvements in flexible shafts involving the use of a plurality of closely and reversely wound wire coils fitted or nested telescopically one within the other and inclosed within a suitable non-rotatable case to be used for any purpose to which such shafts may be applied.

Heretofore so far as I am aware these shafts have been provided with a solid central core around which the wire coils are wound in sequence from the center outward so that each coil was always under more or less expansible and extensible tension, thereby producing excessive friction and wear between contiguous coils and at the same time rendering effective lubrication practically impossible.

The main object of my invention is to reduce this friction and wear to a minimum first by winding and assembling the coils so as to relieve them of their individual tension or expansion one against the other, and second by omitting the usual solid wire to afford a suitable lubricating chamber or passage for the reception of a lubricant or absorbent wick therein, whereby such lubricant may be distributed uniformly throughout the length of the shaft and between the several coils and helices thereof and also between the shaft and casing.

Another object is to provide simple and efficient means for forcibly circulating a lubricating fluid through and around the entire length of the shaft when desired.

Other objects and uses will be brought out in the following description.

In the drawings—

Figure 1 is a side view partly in section and partly broken away of my improved flexible shaft and casing showing one form of a device for forcibly circulating a lubricating fluid through and around the shaft.

Fig. 2 is an enlarged sectional view, partly in elevation, of a portion of the same shaft and casing showing the central oil passage therein.

Fig. 3 is a sectional view similar to Fig. 2 showing a lubricant absorbent or wick extending through the central passage in the shaft.

The rotary shaft —1— comprises a plurality of, in this instance four, wire coils —2— of steel or other suitable material fitted or nested telescopically one within the other and inclosed within a non-rotatable flexible case —3— which is preferably made of closely wound square wire and is incased in a suitable sheath —4— of leather or other flexible material to protect the casing and shaft against dust and other foreign matter and at the same time to afford a more convenient means for handling or manipulating the shaft without liability of injury to the operator.

The adjacent coils —2— of the shaft are preferably wound in reverse directions to give greater unity, strength and durability, but are preferably wound separately as follows: The outer coil is wound to approximately the desired diameter and allowed to expand, after which the next coil is wound in a reverse or opposite direction to approximately the desired size and is then inserted into the expanded outer coil while still under tension, after which it is allowed to expand to fit tightly within said outer coil, this process continuing with each individual coil from the outside inward with as many coils as it may be desired to use in making up the shaft so that each inner coil, although wound in reverse direction, will fit reasonably tight within the next adjacent outer coil, the assembled coils being then inserted into the outer casing, leaving sufficient clearance to permit the rotation of the shaft relatively to said casing without excessive friction and at the same time affording a sufficient annular space around the outermost coil for the circulation of oil or other lubricant in a manner presently described.

The innermost coil instead of being filled as usual with a core is left open to afford a lengthwise passage —5— for the reception of oil, as shown in Figs. 1 and 2, or as shown in Fig. 3, to receive an absorbent body or wick —6— extending throughout the length of the coils for retaining the lubricant and distributing it to the several helices of said coils.

The annular space as —7— between the outer rotary coil and casing —3— may also be used for the reception and retention of a quantity of lubricant or when the wick —6— is omitted the oil may be circulated continuously or intermittingly through the entire length of the central passage —5— and returned through said annular space or vice versa by any suitable force feed device and for this purpose I have shown the passages —5— and —7— at the driving end of the shaft as communicating respectively through branch passages —8— and —9— with a gear pump —10— while the opposite or tool ends of the same passages —5— and —7— communicate with each other through the medium of one or more passages —11— and a chamber —12—.

The gear case as —13— through which the passages —8— and —9— extend forms a convenient cap for the adjacent end of the shaft casing —3— while the opposite end of the shaft-casing is capped by a sleeve or handle —14— of any desired construction.

The gear-case —13— is preferably applied to the adjacent face of a head or frame —15— having suitable bearings for receiving and supporting a driving extension —16— of the flexible shaft —2—, the sleeve or handle —14— being also provided with a central bearing for receiving and supporting an extension —17— on the adjacent end of the flexible shaft which is adapted to receive the working tool not shown.

A driving pulley —18— is shown as secured to the shaft-extension —16— and adapted to be driven from any available source of power (not shown) but it is evident that the construction of the driving means for the flexible shaft is immaterial and that the means for circulating the lubricant through and around said shaft may be varied at will without departing from the spirit of my invention and, therefore, I do not wish to limit myself to the structure shown and described.

What I claim is:

1. A flexible shaft comprising concentric coils having lengthwise outflow and return passages, the central passage of the inner coil being connected by a branch passage to the passage of the outer coil at one end thereof and a source of oil supply at the other ends of said passages.

2. A flexible shaft comprising relatively rotatable wire coils having lengthwise passages, the central passage of the inner coil being connected by a branch passage to the passage of the outer coil at one end thereof and a force feed oil-circulating device connected to the other ends of said passages.

3. A flexible shaft comprising a tubular flexible casing, caps closing the ends of the casing and provided with journal bearings co-axial with said casing, a rotary flexible shaft section extending centrally through the casing and having its ends provided with non-flexible extensions journaled in said bearings, said casing and rotary shaft section being provided with lengthwise passages therethrough connected near one end by a branch passage and a source of oil supply communicating with the other end of said passages.

4. A flexible shaft comprising a tubular flexible case, caps closing the ends of the casing and provided with journal bearings co-axial with said casing, a rotary flexible shaft section extending centrally through the casing and having its ends provided with non-flexible extensions journaled in said bearings, said casing and rotary shaft section being provided with lengthwise passages therethrough connected near one end by a branch passage, and a force feed device connected to the other end of the passages for circulating oil therethrough.

In witness whereof I have hereunto set my hand this 27th day of January, 1914.

CLARENCE F. HOTCHKISS.

Witnesses:
D. WALKER WEAR,
D. S. PHELPS.

Copies of this patent may be obtained for five cents each, by addressing the "Commissioner of Patents, Washington, D. C."